US012770231B2

(12) United States Patent
Rumberg et al.

(10) Patent No.: US 12,770,231 B2
(45) Date of Patent: Oct. 20, 2026

(54) METHOD FOR REDUCING NOISE IN IMAGE DATA

(71) Applicant: Robert Bosch GmbH, Stuttgart (DE)

(72) Inventors: Axel Rumberg, Karlsruhe (DE); Michael Frank, Bretten (DE); Patrick Meyer, Leinfelden-Echterdingen (DE); Tim Saup, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 18/964,066

(22) Filed: Nov. 29, 2024

(65) Prior Publication Data

US 2025/0182252 A1 Jun. 5, 2025

(51) Int. Cl.
*G06T 5/70* (2024.01)
*G01J 5/48* (2022.01)
(Continued)

(52) U.S. Cl.
CPC ................ *G06T 5/70* (2024.01); *G01J 5/485* (2022.01); *G06T 5/50* (2013.01); *G06T 7/0002* (2013.01);
(Continued)

(58) Field of Classification Search
CPC .. G01N 25/72; G01N 25/482; G01N 25/4846; G01N 33/383; G06T 2207/10048; G06T 2207/20182; G06T 2207/20221; G06T 5/50; G06T 2207/10024; G06T 5/70; G06T 5/73; G06T 5/20; G06T 7/11; G06T 2207/20032
(Continued)

(56) References Cited

U.S. PATENT DOCUMENTS

2002/0132360 A1 9/2002 Neilson et al.
2020/0045231 A1* 2/2020 Frank ........................ G06T 5/70
(Continued)

FOREIGN PATENT DOCUMENTS

WO 2018/065143 A1 4/2018

OTHER PUBLICATIONS

Hasinoff et al., "Burst Photography for High Dynamic Range and Low-Light Imaging on Mobile Cameras", ACM Trans. Graph, Nov. 2016, pp. 192:1-192:12, vol. 35, No. 6, Article 192 (12 Pages).

*Primary Examiner* — Masum Billah
(74) *Attorney, Agent, or Firm* — Maginot, Moore & Beck LLP

(57) ABSTRACT

A method for reducing noise in image data includes (i) providing image data, wherein the image data comprises at least one thermal image, wherein the image data results from a detection of at least one sensor, (ii) determining a temperature difference represented in the at least one thermal image based on an analysis of temperature data of the at least one thermal image, (iii) determining a number of averages for an evaluation of further image data based on the determined temperature difference, wherein the number of averages specifies how many thermal images are averaged for the evaluation of the further image data, wherein the further image data results from a further detection of the at least one sensor, and (iv) reducing the noise in the further image data by the evaluation with the determined number of averages. An associated computer program, a device, and a storage medium are also disclosed.

8 Claims, 4 Drawing Sheets

Figure 1:
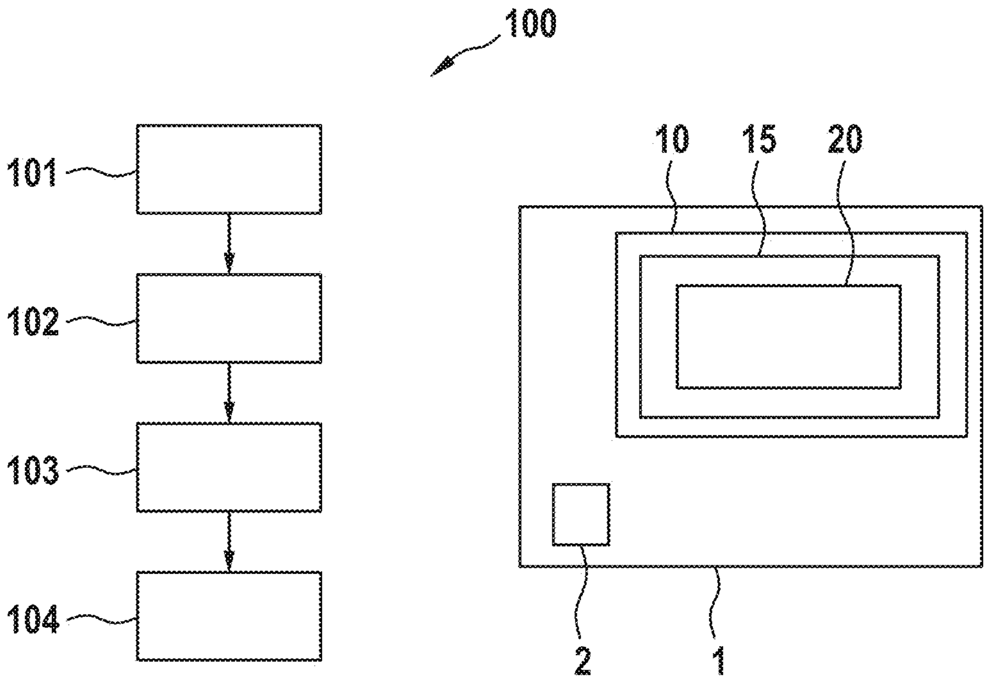

(51) Int. Cl.
*G06T 5/50* (2006.01)
*G06T 7/00* (2017.01)
*H04N 23/23* (2023.01)
*H04N 23/63* (2023.01)

(52) U.S. Cl.
CPC ............. *H04N 23/23* (2023.01); *H04N 23/63* (2023.01); *G06T 2207/10048* (2013.01); *G06T 2207/20216* (2013.01)

(58) Field of Classification Search
USPC .......................................................... 348/165
See application file for complete search history.

(56) References Cited

U.S. PATENT DOCUMENTS

2020/0082513 A1* 3/2020 Winzell .................... G06T 5/40
2021/0218909 A1 7/2021 Schmidt et al.

* cited by examiner

METHOD FOR REDUCING NOISE IN IMAGE DATA

This application claims priority under 35 U.S.C. § 119 to patent application no. DE 10 2023 212 170.0, filed on Dec. 4, 2023 in Germany, the disclosure of which is incorporated herein by reference in its entirety.

The disclosure relates to a method for reducing noise in image data. The disclosure further relates to a computer program, a device, and a storage medium for this purpose.

BACKGROUND

In thermal imaging, noise is elevated due to various factors, such as those related to sensor characteristics. The detectors in thermal cameras are highly sensitive and can capture even minimal temperature differences. However, this sensitivity can also make them susceptible to electronic noise generated in the sensor itself. Furthermore, noise can be a disruptive factor when reading the sensors. When digitizing the analog signal, quantization errors can occur that are interpreted as noise. In particular, high-frequency and stochastic noise can pose a challenge in the context of thermal images. To reduce noise in images, for example, averaging from the field of image processing or motion detection in images is known.

SUMMARY

The subject of the disclosure is a method, a computer program, a device, a computer-readable storage medium, and a camera system having the features set forth below. Further features and details of the disclosure will emerge the description and the drawings. Features and details described in connection with the method according to the disclosure naturally also apply in connection with the computer program, the device, the computer-readable storage medium and the camera system according to the disclosure, and vice versa, so that there is or can always be mutual reference with regard to the disclosure of the individual aspects of the disclosure.

The subject of the disclosure is, in particular, a method for reducing noise in image data, comprising the following steps, wherein the steps can be carried out repeatedly and/or in succession.

In a first step, image data is preferably provided, wherein the image data comprises at least one thermal image. The image data results in particular from a detection of at least one sensor. The at least one sensor is preferably a thermal imaging camera sensor, which for example comprises an infrared detector array, so that the image data is in particular thermal image data. The provision of image data can therefore be a provision of thermal image data. The thermal images can be infrared images.

In a further step, a temperature difference represented in the at least one thermal image is preferably determined based on an analysis of temperature data from the at least one thermal image. The temperature difference thus reflects in particular a range between a lowest and a highest temperature value represented in the thermal image. The temperature difference is preferably determined for a respective individual thermal image. The temperature data are, in particular, individual temperature values, which are represented by respective colors in the thermal images. Furthermore, a so-called span can be determined on the basis of the temperature difference in the image, which is specific for the representation of the temperature data in the thermal images in the form of color values. For example, the minimum span can be defined as 5° C., wherein the span is a difference between a minimum and a maximum temperature represented in the image. The span can correspond to the value of the temperature difference from exceeding the defined minimum span. Furthermore, an evaluation of the temperature distribution using a histogram is also conceivable, wherein, for example, not all temperature values are taken into account, but only the inner 98%.

In a further step, a number of averages is preferably determined for an evaluation of further image data on the basis of the determined temperature difference. It is also conceivable that the number of averages is determined on the basis of the span determined on the basis of the temperature difference. The number of averages specifies in particular how many thermal images are averaged for the evaluation of further image data. The further image data results from a further detection of the at least one sensor, i.e. in particular the same at least one sensor from which the image data results. This means that the further image data is also preferably thermal image data. For example, with an exemplary number of five averages, five respective temperature values from five thermal images can be averaged for a respective pixel or for a respective range of pixels. In particular, a smaller number of averages may be provided for a larger temperature difference than for a smaller temperature difference. The number of averages can also correspond to a value of one, whereby no averaging but a single evaluation of a respective thermal image is provided.

It can also be provided that a frame rate of the camera system according to the disclosure is influenced on the basis of the determined number of averages, or that a change in the frame rate is initiated. For example, the frame rate can double if averaging is determined by a number of two.

In a further step, the noise in the further image data is preferably reduced by evaluating it with the specified number of averages. The reduction in noise is a particular consequence of the averaging, as outliers in individual thermal images have a lower amplitude due to the averaging. The basic principle of noise reduction is to capture several successive temperature data in thermal images for a respective pixel or pixel area and to calculate the average of these temperature data. By averaging, random noise components, which vary from thermal image to thermal image, can be advantageously reduced.

In mathematical terms, this can be formulated as follows:

$$Mittelwert(x) = \frac{1}{N}\sum_{i=1}^{N} x_i$$

Here $x_i$ is the i-th temperature data of a respective pixel or pixel area x and N is the number of thermal images that are included in the averaging. By increasing the value for N, the efficiency of the noise suppression can be improved, but at the expense of the temporal resolution of the signal.

Advantageously, the disclosure may provide that the determination of the number of averages comprises the following steps:

- defining at least two ranges for the temperature difference, whereby a defined number of averages is assigned to a respective range,
- determining the number of averages based on a comparison of the determined temperature difference with the at least two defined ranges for the temperature difference.

For example, a range can be defined for a temperature difference of at least 10° C., to which an averaging over two thermal images is assigned, and a further range for a temperature difference of less than 10° C., to which an averaging over four thermal images is assigned. Accordingly, a number of two averages can be determined for a determined temperature difference of 12° C., for example. Advantageously, the number of areas can be varied according to the application at hand; for example, at least three areas can also be defined.

Optionally, the method may further comprise the following step:

evaluating the further image data, whereby a respective resulting thermal image is determined on the basis of the number of averages.

The resulting thermal image thus corresponds in particular to the result of averaging over the specified number of thermal images.

According to a further advantage, it may be provided that the method further comprises the following step:

initiating output of the respective resulting thermal image.

The output can, for example, take place by way of an output unit, which can be designed as a screen. The screen may be arranged on a camera system according to the disclosure, which may further comprise the at least one sensor, i.e. preferably a thermal imaging camera sensor comprising, for example, an infrared detector array.

It is also optionally conceivable that the evaluation of the further image data comprises the following step:

calculating an average value for at least one respective pixel of the respective resulting thermal image on the basis of the further image data and the number of averages in order to determine a color of the at least one respective pixel by way of the calculated average value.

As a result, a respective temperature value of the specific number of thermal images is averaged for a respective pixel, whereby the respective temperature values are represented by a color in the image data. If the number of averages corresponds to two, for example, two temperature values of a respective pixel of the two respective thermal images are averaged in particular in order to obtain a temperature value and consequently a corresponding color for the respective pixel in the resulting thermal image.

Furthermore, it is optionally provided that the calculation of the average value is only carried out for at least one specific sub-range of the resulting thermal image. For example, the image can be divided into three bars and the averaging can only be carried out in the middle bar. Alternatively, it can be divided into an inner region and an outer region and the averaging can only be carried out in the inner region. It is also conceivable that an approximate area of an object to be detected is determined on the basis of an analysis of the image data, for example by a detection algorithm, in order to then perform the averaging only in the determined approximate area of the object to be detected. By reducing the averaging to at least one specific sub-range, the computational effort can be advantageously reduced.

In a further possibility, it may be provided that at least the provision, in particular of the image data, and/or the determination, in particular of the temperature difference, are carried out cyclically or on the basis of a trigger condition in order to determine a new number of averages for the evaluation. It is therefore conceivable that the image data is provided and/or the temperature difference is determined at intervals of, for example, ten seconds or after a defined number of thermal images captured by the at least one sensor. It is also possible for the triggering condition to be the actuation of a button by a user. The at least one sensor can be a thermal imaging camera sensor comprising, for example, an infrared detector array and part of a camera system according to the disclosure, which additionally comprises the button for initiating the provision of the image data and/or the determination of the temperature difference.

Another object of the disclosure is a computer program, in particular a computer program product, comprising commands which, when the computer program is executed by a computer, cause the computer to carry out the method according to the disclosure. The computer program according to the disclosure thus brings with it the same advantages as have been described in detail with reference to a method according to the disclosure.

The disclosure also relates to a device for data processing which is configured to carry out the method according to the disclosure. The device can be a computer, for example, that executes the computer program according to the disclosure. The computer can comprise at least one processor for executing the computer program. A non-volatile data memory can be provided as well, in which the computer program can be stored and from which the computer program can be read by the processor for execution.

The disclosure can also relate to a computer-readable storage medium, which comprises the computer program according to the disclosure and/or commands that, when executed by a computer, prompt said computer program to carry out the method according to the disclosure. The storage medium is configured as a data memory such as a hard drive and/or a non-volatile memory and/or a memory card, for example. The storage medium can, for example, be integrated into the computer.

Another object of the disclosure can be a camera system comprising at least one sensor, in particular a thermal imaging camera sensor, a device for data processing according to the disclosure and a display, wherein the at least one sensor is designed to capture the image data and the further image data. The camera system according to the disclosure thus has the same advantages as those described in detail with reference to the method according to the disclosure.

In addition, the method according to the disclosure can also be designed as a computer-implemented method.

Figure 2:
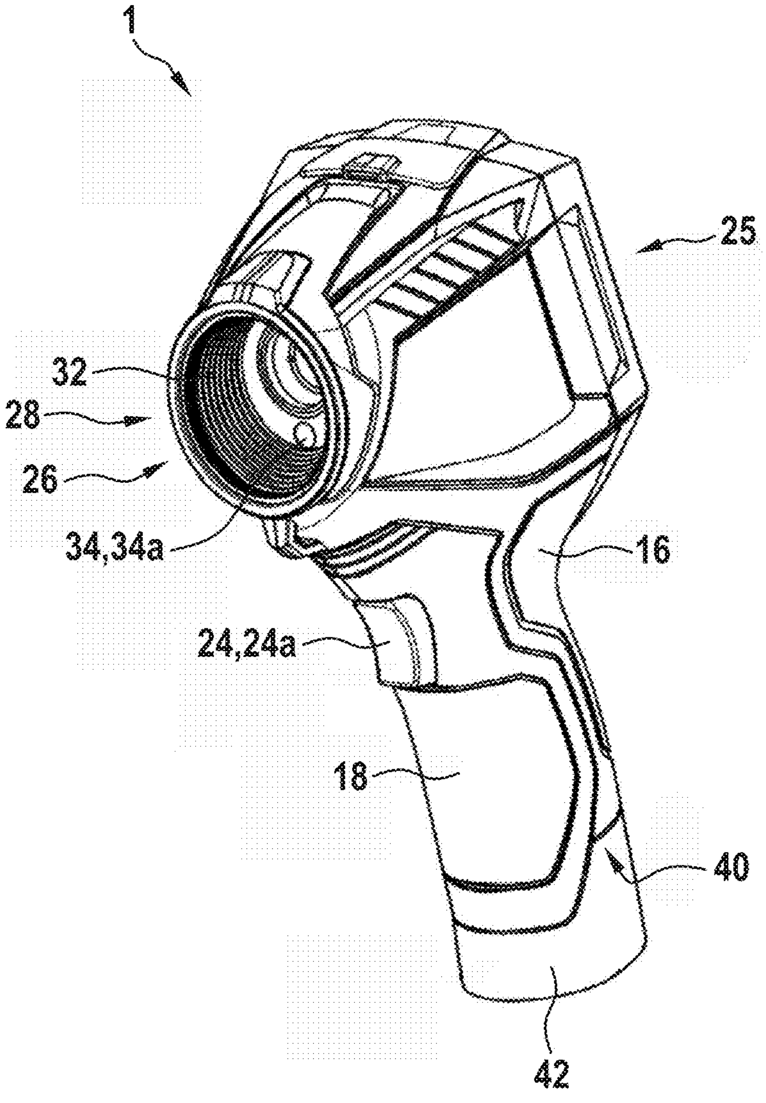
Figure 3:
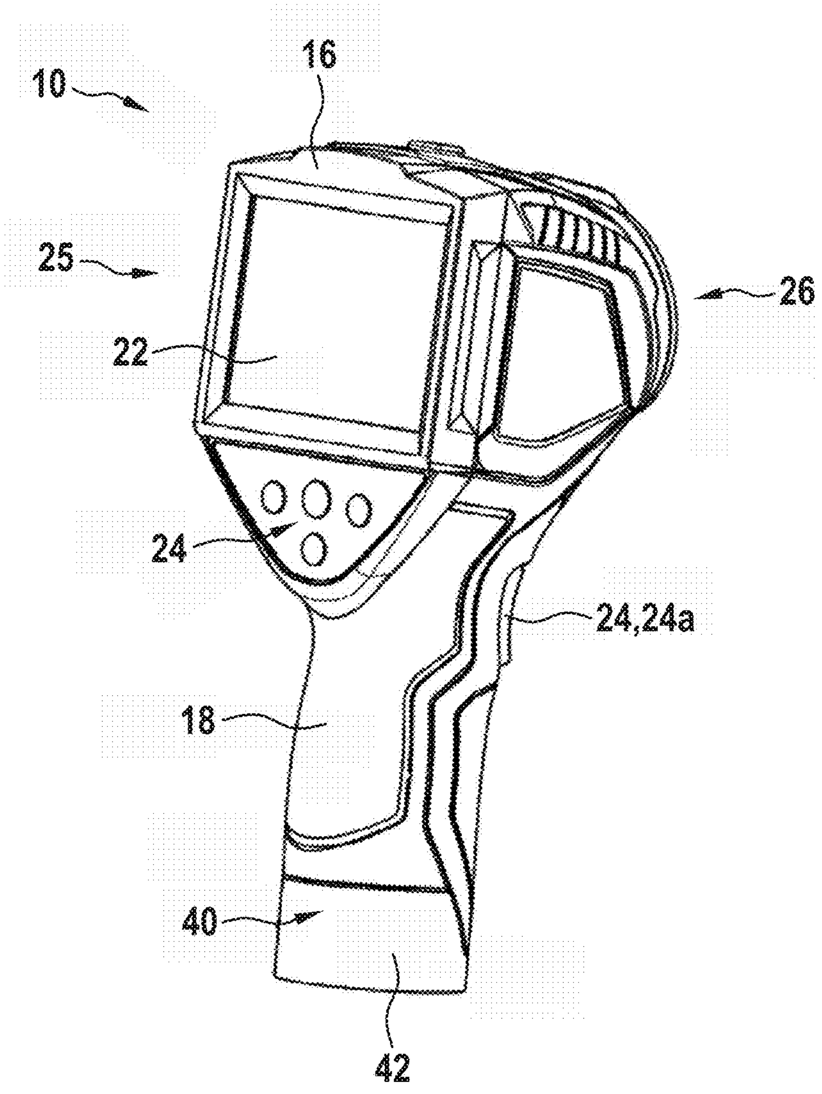
Figure 4:
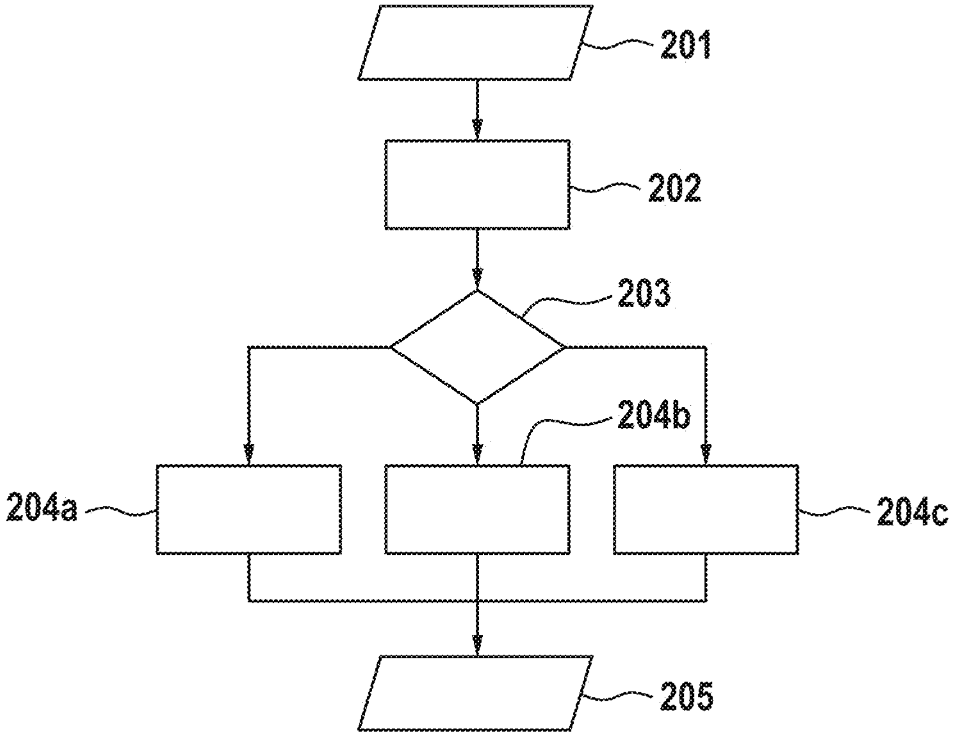
Figure 5:
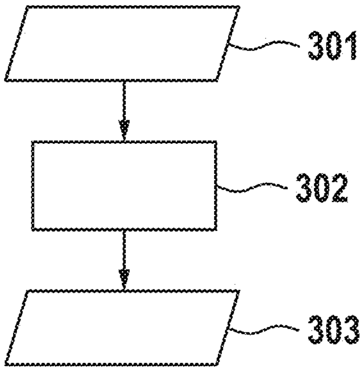

Further advantages, features, and details of the disclosure emerge from the following description, in which exemplary embodiments of the disclosure are described in detail with reference to the drawings. The features mentioned in the claims and in the description can each be essential to the disclosure individually or in any combination. The figures show:

FIG. 1 a schematic visualization of a method, a camera system with a sensor, a device, a storage medium and a computer program according to exemplary embodiments of the disclosure, FIG. 2 a schematic illustration of a camera system in perspective front view according to exemplary embodiments of the disclosure, FIG. 3 schematic illustration of a camera system in perspective rear view according to exemplary embodiments of the disclosure, FIG. 4 a schematic illustration of a method for determining a number of averages according to exemplary embodiments of the disclosure, FIG. 5 a schematic illustration of a method for evaluating further image data according to exemplary embodiments of the disclosure.

FIG. 1 schematically illustrates a method 100, a camera system 1 with a sensor 2, a device 10, a storage medium 15 and a computer program 20 according to exemplary embodiments of the disclosure.

In particular, FIG. 1 shows an exemplary embodiments of a method 100 for reducing noise in image data. In a first step 101, image data is provided, wherein the image data comprises at least one thermal image, wherein the image data results from a detection of at least one sensor 2. In a second step 102, a temperature difference represented in the at least one thermal image is determined based on an analysis of temperature data of the at least one thermal image. In a third step 103, a number of averages is determined for an evaluation of further image data on the basis of the determined temperature difference, wherein the number of averages specifies how many thermal images are averaged in each case for the evaluation of the further image data, wherein the further image data results from a further detection of the at least one sensor 2. In a fourth step, the noise in the further image data is reduced by evaluating it with the specified number of averages.

A camera system 1 according to the disclosure is described below. FIG. 2 and FIG. 3 show an exemplary embodiment of this camera system 1 in a perspective front view and a perspective rear view, respectively. The camera system 1 is designed to determine two-dimensional temperature data, in particular a thermal image, of a scenery to be examined. The scenery can be any arrangement to be examined, which typically comprises objects, in particular surfaces of objects, or the like. Examples of such a scenery could be a house facade, a fuse box, a group of people, a landscape or similar.

The camera system 1 comprises a housing 16 with a handle 18. With the handle 18, the camera system 1 can be held in one hand by a user. The housing 16 of the camera system 1 also has, on a side 25 facing the user during use of the camera system 1, an output device in the form of a touch screen 22 and operating elements 24 for user input and control of the camera system 1. In particular, the camera system 1 also has a button 24*a* with which a user can initiate the determination of the two-dimensional temperature data of the scenery to be examined.

An inlet opening 28 is provided in the housing 16 on the side 26 of the housing 16 facing away from the user. The inlet opening 28 defines (possibly in conjunction with an optical system of the camera system 1 not shown here) the detection range of the camera system 1. The infrared radiation emitted in a solid angle range or in the solid angle range by the scenery, in particular by the objects in the scenery, is detected by the camera system 1. Immediately behind the inlet opening 28, a lens system is located in a stray-light-reducing light tube 32 as an optical system (not shown in more detail here). The lens system is permeable to radiation in the mid-infrared range and is used to focus infrared radiation onto an infrared detector array of camera system 1.

On the side 26 of the housing 16 facing away from the user during use of the camera system 1, a projection device 34 is located in the housing 16, which is designed to convert two-dimensional temperature data determined by way of an infrared detector array into a projectable image and to project this projectable image onto the scenery. In the exemplary embodiments described, the projection device 34 comprises an evaluation device (not shown in detail) and a video projector 34*a* ("beamer"), which is arranged in the housing 16 of the camera system 1. The image 36 projected onto the scenery 14 serves to augment an environment defined by the scenery, in particular by a projection surface of the scenery.

Furthermore, the camera system 1 can have a camera operating in the visual spectrum (not shown here in detail) for capturing visual images. Such images can be output together with a thermal image generated from a temperature measurement initiated by the user, in particular at least partially superimposed or superimposed with the thermal image.

On the underside of the thermal imaging camera 10, the handle 18 also has a receptacle 40 for accommodating an energy storage device 42, which can be in the form of a rechargeable accumulator or in the form of batteries, for example.

FIG. 4 shows an exemplary embodiment of a method for determining a number of averages for an evaluation of image data. The first step 201 is to provide a thermal image with temperature data. In a second step 202, a temperature difference is determined in the thermal image provided. In a third step 203, the temperature difference is evaluated. In the event that the temperature difference has a high value of 50° C., for example, or exceeds a correspondingly defined threshold value, the value one is selected for the number of averages according to step 204*a*. In the event that the temperature difference has an average value of 10° C., for example, or is in a correspondingly defined range, the value two is selected for the number of averages according to step 204*b*. In the event that the temperature difference has a low value of 5° C., for example, or falls below a correspondingly defined threshold value, the value four is selected for the number of averages according to step 204*c*. Subsequently, according to step 205, the correspondingly selected number of averages for an evaluation of further image data is determined or specified.

FIG. 5 shows an example of a method for evaluating further image data. In a first step, 301 further image data is provided. In a second step 302, an average value is determined pixel by pixel on the basis of the determined number of averages. Subsequently, in a third step 303, the thermal image resulting from the pixel-by-pixel calculation is displayed, in particular on a screen 22 of the camera system 1.

The image quality of thermal imaging cameras is determined in particular by resolution and noise (NETD). NETD describes the "Noise Equivalent Temperature Difference", i.e. the thermal noise in the image. A NETD of 50 mK, for example, corresponds to a standard deviation of the image noise in ° C.

Temperatures are preferably displayed as colors in thermal images, whereby the measured temperatures in the scene are typically displayed with 256 or 512 colors. Typically, the minimum span can be 5° C., where the span is a difference between a minimum and a maximum temperature shown in the image. With a small temperature difference of 1° C., for example, the span is 5° C., which can be displayed with 512 colors and lead to a display of about 0.01° C. per color. This corresponds to five colors per NETD, for example. A large temperature difference of 100° C., for example, results in a span of 100° C., which can be displayed with 512 colors and lead to a display of about 0.2° C. per color. This corresponds in particular to one color per NETD.

According to exemplary embodiments, the disclosure is intended to select a suitable averaging of individual images as a function of the span resulting from the temperature difference in the image and thus preferably also to produce an optimum between frame rate and noise.

For example, the chip resulting from the temperature difference is to be calculated. If the temperature threshold per color is close to or above the noise (e.g. 0.2° C. versus 50 mK NETD), a temporal averaging over several images can lead to no or only a relatively small image improvement. A small time averaging and a correspondingly higher refresh rate should preferably be selected here. Conversely, a larger time averaging at the expense of a smaller frame rate can be advantageous with a small span. In addition to these two settings, it is also possible to define further ranges. For example, a very small span could lead to a very large averaging, a small span to a large averaging, a medium span to a normal averaging, a large span to a small averaging and a very large span to a very small averaging. A smooth transition from one range to the next is also conceivable.

A device for data processing 10, or computing unit, provided in the camera system 1 according to exemplary embodiments, preferably continuously determines the temperature difference and the span from the measured temperature data of a respective thermal image. According to exemplary embodiments, the number of thermal images used for time averaging is subsequently adjusted.

The above explanation of the embodiments describes the present disclosure solely within the scope of examples. Of course, individual features of the embodiments may be freely combined with one another, if technically feasible, without leaving the scope of the present disclosure.

What is claimed is:

1. A method for reducing noise in image data, comprising:

providing image data including at least one thermal image detected using at least one sensor;

determining a temperature difference represented in the at least one thermal image based on an analysis of temperature data of the at least one thermal image;

determining a number of thermal images to be averaged based on the determined temperature difference, wherein the number of thermal images to be averaged specifies how many thermal images are averaged in an evaluation of further image data including at least one further thermal image detected using the at least one sensor;

reducing the noise in the further image data in the evaluation based on the determined number of thermal images to be averaged; and determining a respective resulting thermal image based on the number of thermal images to be averaged, wherein the evaluation of the further image data includes calculating an average value for at least one respective pixel of the respective resulting thermal image based on the further image data and the number of thermal images to be averaged in order to determine a color of the at least one respective pixel by way of the calculated average value.

2. The method according to claim 1, wherein determining the number of averages comprises:

defining at least two ranges for the temperature difference, whereby a defined number of thermal images to be averaged is assigned to each respective range of the at least two ranges, and determining the number of thermal images to be averaged based on a comparison of the determined temperature difference with the at least two defined ranges for the temperature difference.

3. The method according to claim 1, further comprising initiating output of the respective resulting thermal image.

4. The method according to claim 1, wherein the calculation of the average value is only carried out for at least one specific sub-area of the resulting thermal image.

5. The method according to claim 1, wherein at least one of (i) the providing and (ii) the determining the temperature difference are performed cyclically or based on a trigger condition in order to determine a new number of thermal images to be averaged for the evaluation.

6. A device for data processing configured to carry out the method according to claim 1.

7. A non-transitory computer-readable storage medium, comprising commands which, when executed by a computer, cause the computer to carry out the method according to claim 1.

8. A camera system, comprising:

at least one sensor;

a device for data processing according to claim 6, and a display, wherein the at least one sensor is designed to detect the image data and the further image data.

* * * * *